United States Patent
Sugiyama et al.

(10) Patent No.: US 11,560,172 B2
(45) Date of Patent: Jan. 24, 2023

(54) MOTOR CONTROL DEVICE

(71) Applicants: JTEKT CORPORATION, Osaka (JP); DENSO CORPORATION, Kariya (JP)

(72) Inventors: Satoshi Sugiyama, Chiryu (JP); Yoshihide Kuroda, Kariya (JP)

(73) Assignees: JTEKT CORPORATION, Osaka (JP); DENSO CORPORATION, Kariya (JP)

( * ) Notice: Subject to any disclaimer, the term of this patent is extended or adjusted under 35 U.S.C. 154(b) by 252 days.

(21) Appl. No.: 16/751,619

(22) Filed: Jan. 24, 2020

(65) Prior Publication Data
US 2020/0255058 A1  Aug. 13, 2020

(30) Foreign Application Priority Data
Feb. 7, 2019 (JP) .............................. JP2019-020263

(51) Int. Cl.
*B62D 5/04* (2006.01)
*G06F 13/362* (2006.01)
(Continued)

(52) U.S. Cl.
CPC .......... *B62D 5/0463* (2013.01); *G06F 13/362* (2013.01); *H02P 25/22* (2013.01);
(Continued)

(58) Field of Classification Search
CPC ..... B62D 5/0463; G06F 13/362; H02P 25/22; H02P 27/06; H04L 67/1097; Y10S 707/99931
See application file for complete search history.

(56) References Cited

U.S. PATENT DOCUMENTS 11,124,225 B2 * 9/2021 Jeong .................. B60R 16/0231
2005/0205345 A1 * 9/2005 Hayashi ............. B62D 15/0285
180/446
(Continued)

FOREIGN PATENT DOCUMENTS

CN 105531178 B * 11/2018 ............. B62D 5/046
DE 102017129517 A1 * 6/2018 ............. B60Q 1/346
(Continued)

*Primary Examiner* — Shean Tokuta
(74) *Attorney, Agent, or Firm* — Maschoff Brennan

(57) ABSTRACT

A motor control device drives a motor based on a vehicle signal including drive assist information and performs vehicle control. The motor control device includes: a first controller and a second controller that perform a calculation operation concerning drive control over the motor. A first microcomputer corresponds to a calculation portion of the first controller. A second microcomputer corresponds to a calculation portion of the second controller. The first microcomputer and the second microcomputer mutually transmit and receive operation results by inter-microcomputer communication, or the first microcomputer unilaterally transmits an operation result from the first microcomputer by the inter-microcomputer communication. The first microcomputer and the second microcomputer synchronize timings to start and end control by performing at least one of three types of arbitration processes including: an AND-start arbitration process; an OR-start arbitration process; and a forced arbitration process.

12 Claims, 11 Drawing Sheets

(51) Int. Cl.
*H02P 25/22* (2006.01)
*H04L 67/1097* (2022.01)
*H02P 27/06* (2006.01)

(52) U.S. Cl.
CPC .......... *H04L 67/1097* (2013.01); *H02P 27/06* (2013.01); *Y10S 707/99931* (2013.01)

(56) References Cited

U.S. PATENT DOCUMENTS

| | | | |
|---|---|---|---|
| 2005/0267684 A1* | 12/2005 | Kawakami | B62D 15/025 180/170 |
| 2014/0257638 A1* | 9/2014 | Yamada | B62D 5/064 701/41 |
| 2016/0225261 A1* | 8/2016 | Matsumoto | B62D 15/0255 |
| 2017/0190354 A1* | 7/2017 | Ko | B62D 15/0285 |
| 2018/0086369 A1* | 3/2018 | Yanagi | B62D 5/0463 |
| 2018/0297638 A1* | 10/2018 | Fujii | B60W 30/18163 |
| 2018/0297639 A1* | 10/2018 | Fujii | G05D 1/0212 |
| 2018/0297640 A1* | 10/2018 | Fujii | B62D 6/04 |
| 2019/0064829 A1* | 2/2019 | Ozawa | B60W 10/184 |
| 2019/0241207 A1* | 8/2019 | Jeong | B62D 15/021 |
| 2019/0260324 A1 | 8/2019 | Kuramitsu et al. | |
| 2019/0283777 A1* | 9/2019 | Mimura | B60Q 3/70 |
| 2019/0326843 A1* | 10/2019 | Kawai | B62D 5/0484 |
| 2019/0363664 A1* | 11/2019 | Nakamura | B62D 5/046 |
| 2020/0076343 A1* | 3/2020 | Zhang | B62D 5/0463 |
| 2020/0148214 A1* | 5/2020 | Tamagaki | G06V 20/597 |
| 2020/0172153 A1* | 6/2020 | Kawamura | H02P 25/22 |
| 2020/0198696 A1* | 6/2020 | Kawamura | B62D 5/0406 |
| 2020/0255058 A1* | 8/2020 | Sugiyama | H02P 5/74 |

FOREIGN PATENT DOCUMENTS

| | | | | |
|---|---|---|---|---|
| EP | 3299257 A1 | * | 3/2018 | .............. B62D 5/003 |
| EP | 3693249 A1 | * | 8/2020 | .............. B60L 15/20 |
| FR | 2696702 A1 | * | 4/1994 | .............. B60T 8/885 |
| JP | 63-253964 A | | 10/1988 | |
| JP | 2003319683 A | * | 11/2003 | .............. B62D 5/0457 |
| JP | 2010125952 A | * | 6/2010 | |
| JP | 2011-216007 A | | 10/2011 | |
| JP | 6258166 B2 | | 1/2018 | |
| JP | 2018036754 A | * | 3/2018 | .............. B60K 6/445 |
| JP | 2018-111391 A | | 7/2018 | |
| JP | 2018103766 A | * | 7/2018 | .............. B60Q 1/346 |
| JP | 2018103768 A | * | 7/2018 | .............. B60Q 1/346 |
| JP | 2018-130007 A | | 8/2018 | |
| JP | 2018153070 A | * | 9/2018 | .............. B60R 16/02 |
| WO | WO-2017094316 A1 | * | 6/2017 | .............. B60R 21/00 |

* cited by examiner

SINGLE SYSTEM

DUAL SYSTEM

FIG. 7

FIRST SYSTEM

START → PERFORM SPORTS MODE CONTROL OPERATION (S610) → PERFORM ASSIST MAP OPERATION (S620) → PERFORM CONTROL MAP STATE OPERATION (S630) → STEERING WHEEL OPERATED BY DRIVER? (S64)
- YES → DO NOT SWITCH ASSIST MAP (S66) → END
- NO → SWITCH ASSIST MAP (S65) → END

CONTROL MAP STATE COMMUNICATION

SECOND SYSTEM

START → PERFORM SPORTS MODE CONTROL OPERATION (S610) → PERFORM ASSIST MAP OPERATION (S620) → PERFORM CONTROL MAP STATE OPERATION (S630) → STEERING WHEEL OPERATED BY DRIVER? (S64)
- YES → DO NOT SWITCH ASSIST MAP (S66) → END
- NO → SWITCH ASSIST MAP (S65) → END

MOTOR CONTROL DEVICE

CROSS REFERENCE TO RELATED APPLICATIONS

The present application claims the benefit of priority from Japanese Patent Application No. 2019-20263 filed on Feb. 7, 2019. The entire disclosure of the above application is incorporated herein by reference.

TECHNICAL FIELD

The present invention relates to a motor control device.

BACKGROUND

A motor control device that controls motor driving by using two controllers has been known.

For example, a technology that is applied to a dual-system control device including a main system and a sub-system and enables normal control to continue when a malfunction occurs on a communication module or an AD conversion module in the main system, has been proposed.

SUMMARY

According to one example, a motor control device drives a motor based on a vehicle signal including drive assist information and performs vehicle control. The motor control device includes: a first controller and a second controller that perform a calculation operation concerning drive control over the motor. A first microcomputer corresponds to a calculation portion of the first controller. A second microcomputer corresponds to a calculation portion of the second controller. The first microcomputer and the second microcomputer mutually transmit and receive operation results by inter-microcomputer communication, or the first microcomputer unilaterally transmits an operation result from the first microcomputer by the inter-microcomputer communication. The first microcomputer and the second microcomputer synchronize timings to start and end control by performing at least one of three types of arbitration processes including: an AND-start arbitration process; an OR-start arbitration process; and a forced arbitration process.

BRIEF DESCRIPTION OF DRAWINGS

The objects, features and advantages of the present disclosure will become more apparent from the following detailed description made with reference to the accompanying drawings. In the drawings

FIG. 7 is a flowchart illustrating assist map changeover according to the embodiment;

DETAILED DESCRIPTION

Figure 1:
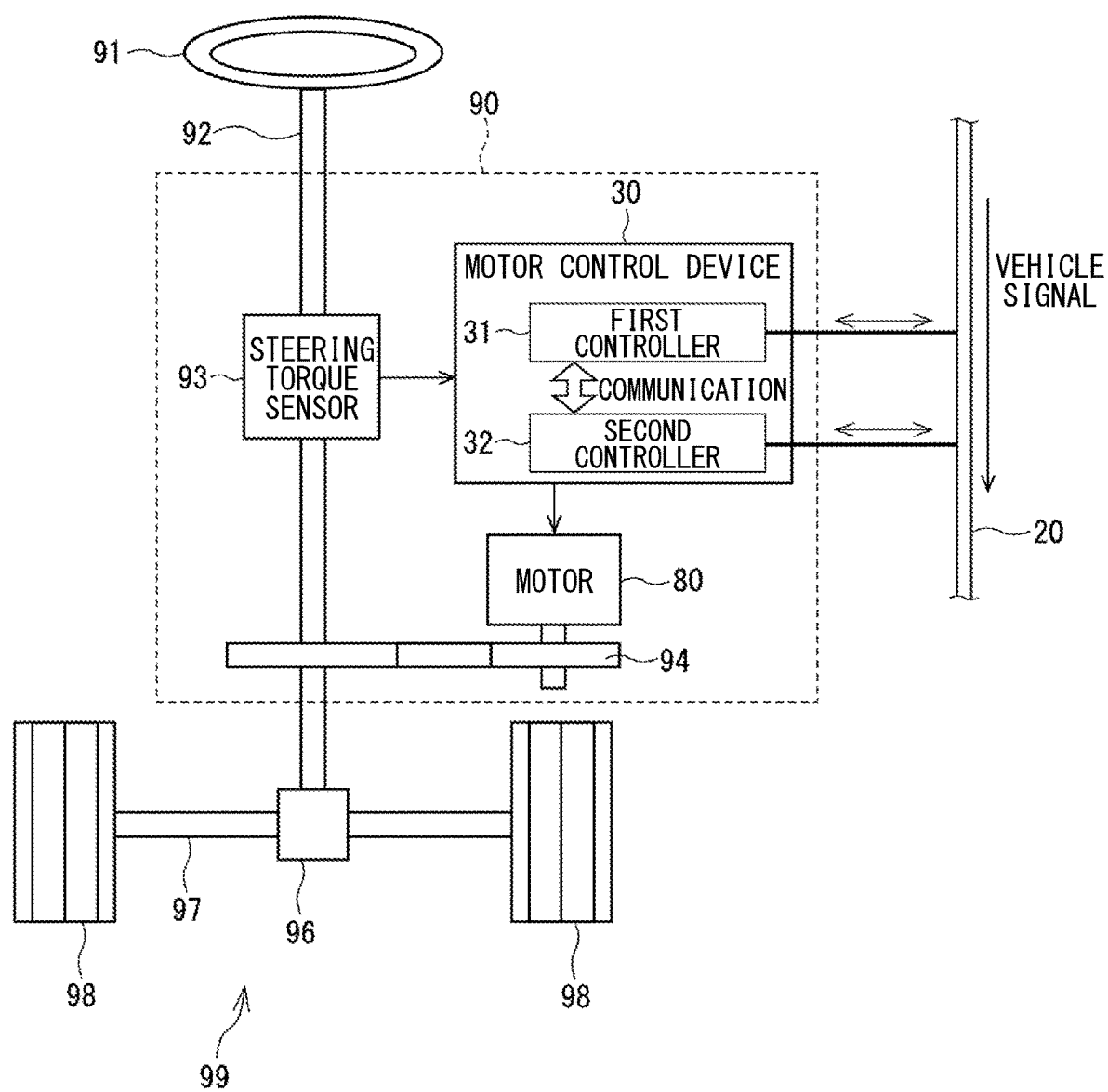
FIG. 1 is an overall configuration diagram illustrating an electric power steering system to which the motor control device according to an embodiment is applied.

A motor control device is assumed that drives a motor contributing to vehicle operations based on vehicle signals including drive assist information and provides vehicle control. For example, a motor control device applied to the electric power steering system drives a steering assist motor mainly based on a lane keep assist signal for steering assist and steers a vehicle steering wheel. In the present disclosure, the concept of "drive assist" includes "automatic operation."

When the two controllers control the motor control device, one controller may control the vehicle, but the other controller may not control the vehicle due to improper timing in communication or calculation during a vehicle control on/off operation. It may be difficult to provide the intended vehicle control corresponding to vehicle signals. An abnormality may be determined depending on cases. The electric power steering system may stop the assist, for example.

One example provides a motor control device that includes two controllers and synchronizes timing to start and end vehicle control.

According to one example embodiment, a motor control device drives a motor contributing to vehicle operations based on a vehicle signal including drive assist information and performs vehicle control. The motor control device includes a first controller and a second controller that perform a calculation operation concerning the motor drive control based on a vehicle signal acquired from an in-vehicle communication line.

A first microcomputer provides a calculation operation portion of the first controller and functions as a master. A second microcomputer provides a calculation operation portion of the second controller and functions as a slave. The first microcomputer and the second microcomputer use inter-microcomputer communication to mutually transmit and receive operation results from the first microcomputer and the second microcomputer. Alternatively, the first microcomputer uses inter-microcomputer communication to unilaterally transmit an operation result from the first microcomputer.

The first microcomputer and the second microcomputer synchronize timings to start and end control by performing at least one of three types of arbitration processes such as an "AND-start arbitration process," an "OR-start arbitration process," and a "forced arbitration process." The AND-start arbitration process starts control when a start condition is satisfied in operation results from both microcomputers and ends the control when an end condition is satisfied in an operation result from at least one of the first microcomputer or the second microcomputer. The OR-start arbitration process starts control when a start condition is satisfied in an operation result from at least one of the first microcomputer or the second microcomputer and ends the control when an end condition is satisfied in operation results from both microcomputers. The forced arbitration process starts control when a start condition is satisfied in an operation result from the first microcomputer and ends the control when an end condition is satisfied in an operation result from the first microcomputer.

The motor control device according to the present disclosure performs at least one of the above-described three types of arbitration processes. The motor control device including the two controllers can synchronize timings to start and end the vehicle control. Therefore, it is possible to provide intended vehicle control corresponding to vehicle signals.

Embodiment

The description below explains an embodiment of the motor control device with reference to the drawings. The motor control device according to the present embodiment is applied to an electric power steering (EPS) system of a vehicle, drives a steering assist motor, and performs vehicle control based on vehicle signals including drive-assist information. The steering assist motor corresponds to a "motor contributing to vehicle operations." An operation to steer a vehicle steering wheel based on output from the steering assist motor corresponds to a "vehicle control." The "drive assist" includes an operation to assist a driver in steering and an "automatic operation" to steer a vehicle only based on output from the control device without steering by the driver.

In EPS system, the vehicle signals including the drive assist information include LDA (lane departure alert), PCS (pre-crash safety), LTC (lane trace control), IPA (intelligent parking assist), for example. These vehicle signals prevent a traveling vehicle from departing from lanes or colliding and assist steering while the vehicle is parked.

FIG. 1 illustrates an overall configuration of a steering system 99 including an EPS 90. The EPS 90 in FIG. 1 complies with the column assist type. However, a motor control device 30 according to the present embodiment is also applicable to the EPS according to the rack assist type. The steering system 99 mainly includes a steering wheel 91, a steering shaft 92, a pinion gear 96, a rack shaft 97, a wheel 98, and the EPS 90. The steering wheel 91 connects with the steering shaft 92.

The pinion gear 96 provided at the end of the steering shaft 92 engages with the rack shaft 97. Both ends of the rack shaft 97 are provided with a pair of wheels 98 mainly via tie rods. When a driver rotates the steering wheel 91, the steering shaft 92 connected to the steering wheel 91 rotates. The pinion gear 96 converts the rotational motion of the steering shaft 92 into linear motion of the rack shaft 97. The pair of wheels 98 is steered at an angle corresponding to a displacement of the rack shaft 97.

The EPS 90 mainly includes a steering torque sensor 93, the motor control device 30, a motor 80, and a deceleration gear 94. The steering torque sensor 93 is provided halfway through the steering shaft 92 and detects a driver's steering torque. During manual operation, the motor control device 30 controls the drive of the motor 80 so that the motor 80 outputs a necessary assist torque based on a detected steering torque signal. The assist torque output from the motor 80 is transmitted to the steering shaft 92 via the deceleration gear 94.

The motor control device 30 includes two controllers such as a first controller 31 and a second controller 32. The first controller 31 and the second controller 32 can transmit and receive various signals by using an in-vehicle communication line 20 such as CAN communication and acquire vehicle signals from the in-vehicle communication line 20. Based on the acquired signal, the first controller 31 and the second controller 32 perform calculation related to the drive control over the motor 80. The calculation operations include calculation of control amounts such as current and voltage and determination on an on/off condition of flags.

Figure 2:
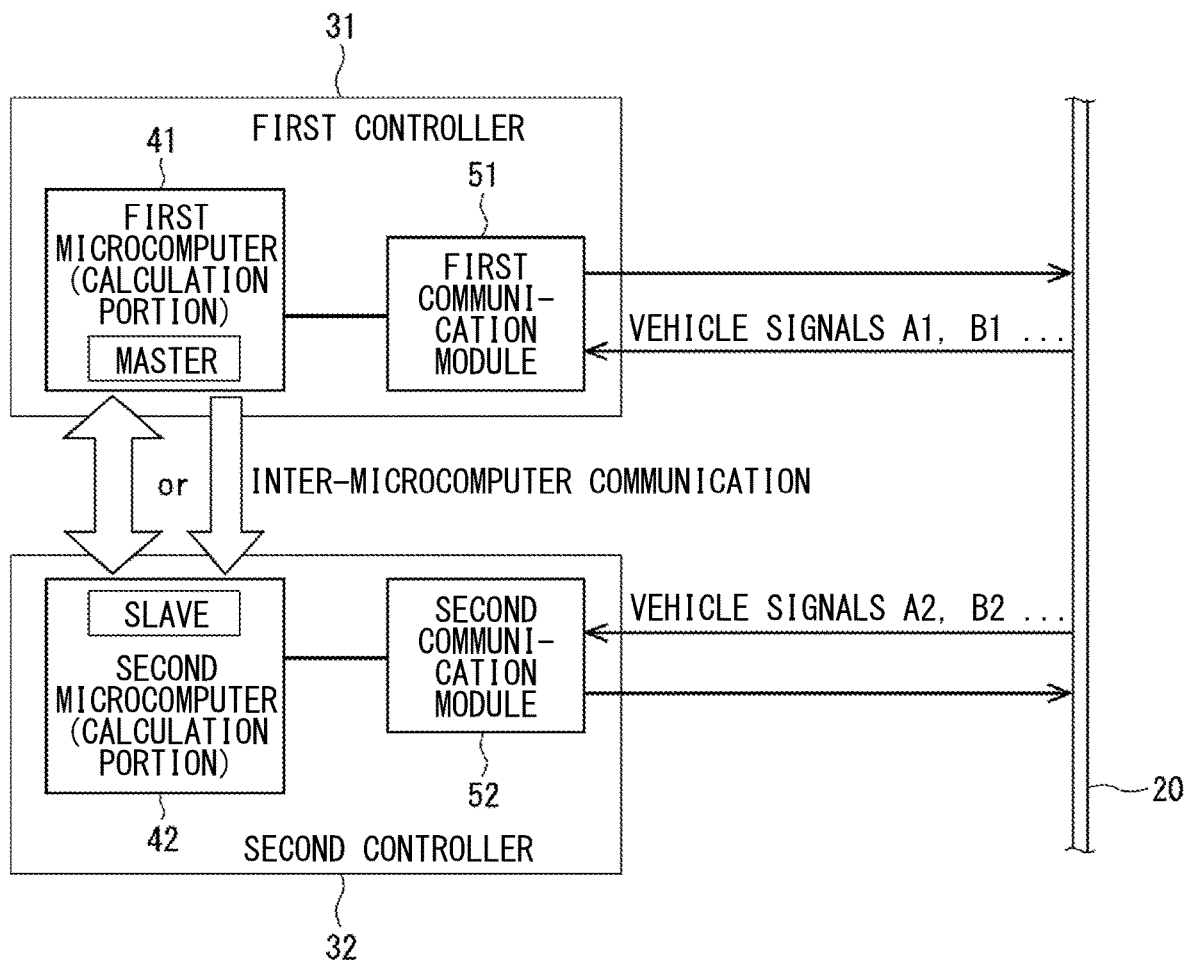
FIG. 2 is a schematic diagram illustrating a communication configuration of the motor control device.

In detail, as illustrated in FIG. 2, the first controller 31 includes a first microcomputer 41 and a first communication module 51. The first microcomputer 41 is provided as an operation portion and functions as a master. The second controller 32 includes a second microcomputer 42 and a second communication module 52. The second microcomputer 42 is provided as an operation portion and functions as a slave. The communication modules 51 and 52 of the controllers 31 and 32 transmit and receive signals from the in-vehicle communication line 20. There is no limitation on the physical placement of the microcomputers 41 and 42 and the communication modules 51 and 52 in the controllers 31 and 32. Namely, the communication module may be provided as a standalone microcomputer chip or may be contained in a microcomputer chip.

The communication modules 51 and 52 acquire multiple vehicle signals from the in-vehicle communication line 20. The vehicle signals are individually represented by symbols A, B, and so on based on differences in signal types or the time to generate the signals. Vehicle signal A is denoted as A1 when supplied to the first controller 31 or is denoted as A2 when supplied to the second controller 32. Vehicle signal A is input as vehicle signals A1 and A2 to the communication modules 51 and 52 from the in-vehicle communication line 20. Similarly, vehicle signal B is input as vehicle signals B1 and B2 to the communication modules 51 and 52 from the in-vehicle communication line 20.

The first microcomputer 41 performs operations mainly based on vehicle signals A1 and B1. The second microcomputer 42 performs operations mainly based on vehicle signals A2 and B2. The first microcomputer 41 and the second microcomputer 42 use the inter-microcomputer communication to mutually transmit and receive operation results from the microcomputers 41 and 42. Alternatively, the first microcomputer uses the inter-microcomputer communication to unilaterally transmit operation results of the first microcomputer. The motor control device 30 performs the vehicle control by controlling the drive of the motor 80 based on operation results of the microcomputers 41 and 42.

The microcomputers 41 and 42 may provide processes as software allowing the CPU to execute a program previously stored in a tangible memory device such as ROM or as hardware in the form of a special-purpose electronic circuit.

Figure 3A:
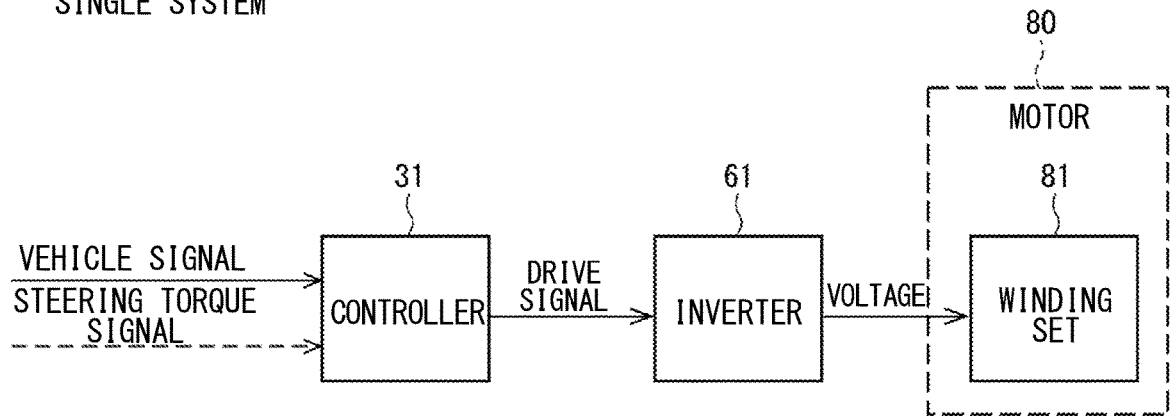
FIG. 3A is a schematic diagram illustrating a motor drive configuration according to a single system.
Figure 3B:
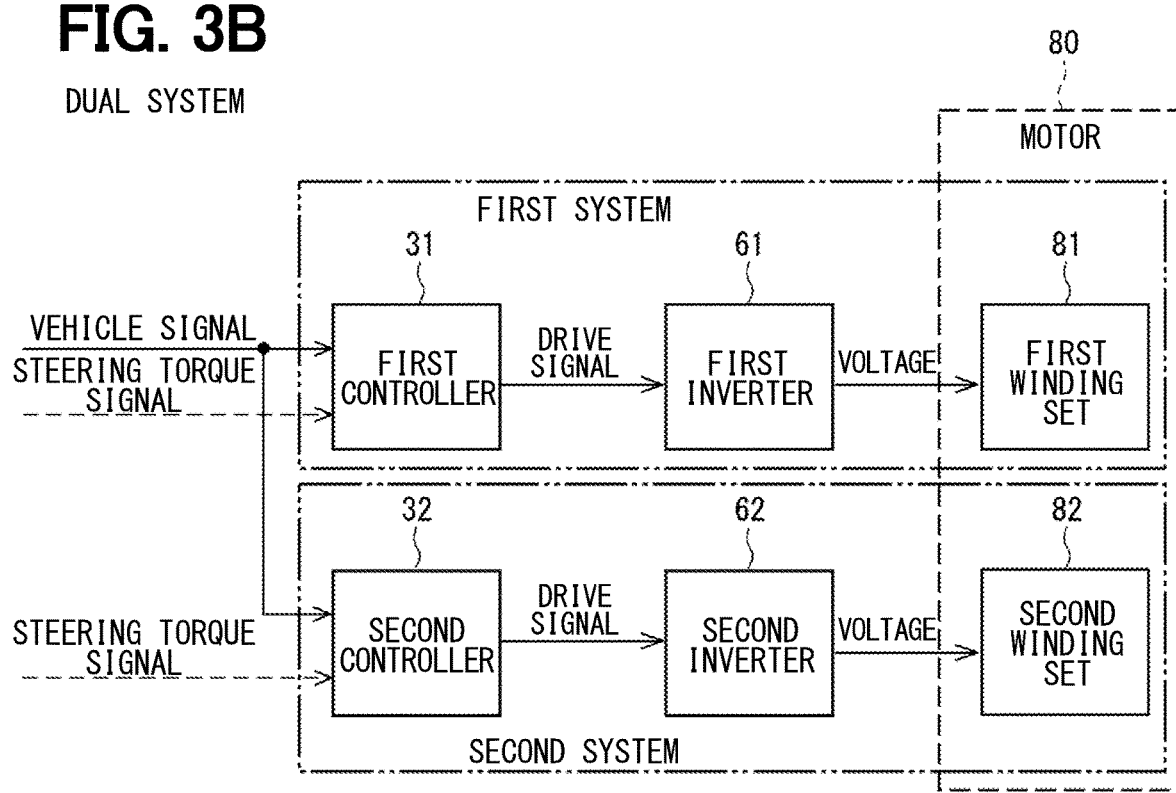
FIG. 3B is a schematic diagram illustrating a motor drive configuration according to a dual system.

The description below explains a motor drive configuration according to a single system and a dual system with reference to FIG. 3A and FIG. 3B. In the description below, the term "system" signifies the unit of a controller, an inverter, and a motor winding set that are provided correspondingly. FIG. 3A illustrates a single system configuration as a comparative example. FIG. 3B illustrates a dual system configuration according to the present embodiment. The motor 80 represents a three-phase brushless motor, for example.

In the single-system motor drive configuration, a vehicle signal and a steering torque signal are input to one controller 31. The controller 31 calculates a drive signal based on the vehicle signal and the steering torque signal and outputs the drive signal to an inverter 61. The inverter 61 performs switching operation based on the drive signal and applies an alternating voltage to a winding set 81 of the motor 80. This configuration does not need arbitrate multiple signals.

In the dual-system motor drive configuration, the first system includes the first controller 31, a first inverter 61, and a first winding set 81. The second system includes the second controller 32, a second inverter 62, and a second winding set 82. The controllers 31 and 32 in the respective systems calculate drive signals based on the vehicle signals and steering torque signals and output the drive signals to the inverters 61 and 62 in the corresponding systems. The inverters 61 and 62 perform switching operations based on the corresponding drive signals and apply alternating voltages to the corresponding winding sets 81 and 82 of the motor 80.

The steering torque sensor 93 may be redundantly provided for signals input to the controllers 31 and 32 in the respective systems. In this case, different steering torque signals are input to the respective systems. Then, the controllers 31 and 32 cannot generate output, causing an effect such as an operating noise. However, this can be solved by correcting the drive signals to have the same instruction value via inter-microcomputer communication.

Meanwhile, the in-vehicle communication line 20 inputs the same vehicle signal to the controllers 31 and 32 in the respective systems. After the vehicle signal is input, the controllers 31 and 32 generate the same output during the vehicle control operation as normal operation. However, a vehicle control on/off operation arbitrates between a vehicle control signal and internal signals for the controllers 31 and 32. Finally, it is determined whether to perform the vehicle control.

The description below explains an example of determining the start of vehicle control in EPS with reference to the main flowchart in FIG. 4 and sub-flowcharts in FIGS. 5 and 6. In the description of flowcharts below, the symbol "S" denotes a step. The third digit of a step number is given "0" to denote that the step is described as an already defined process.

In this example, the first microcomputer 41 as the master in the first system calculates a current instruction value. The microcomputers 41 and 42 perform the same calculation in a step independent of the master or the slave. The same number is given to substantially the same step and a description is omitted as needed for simplicity.

Figure 4:
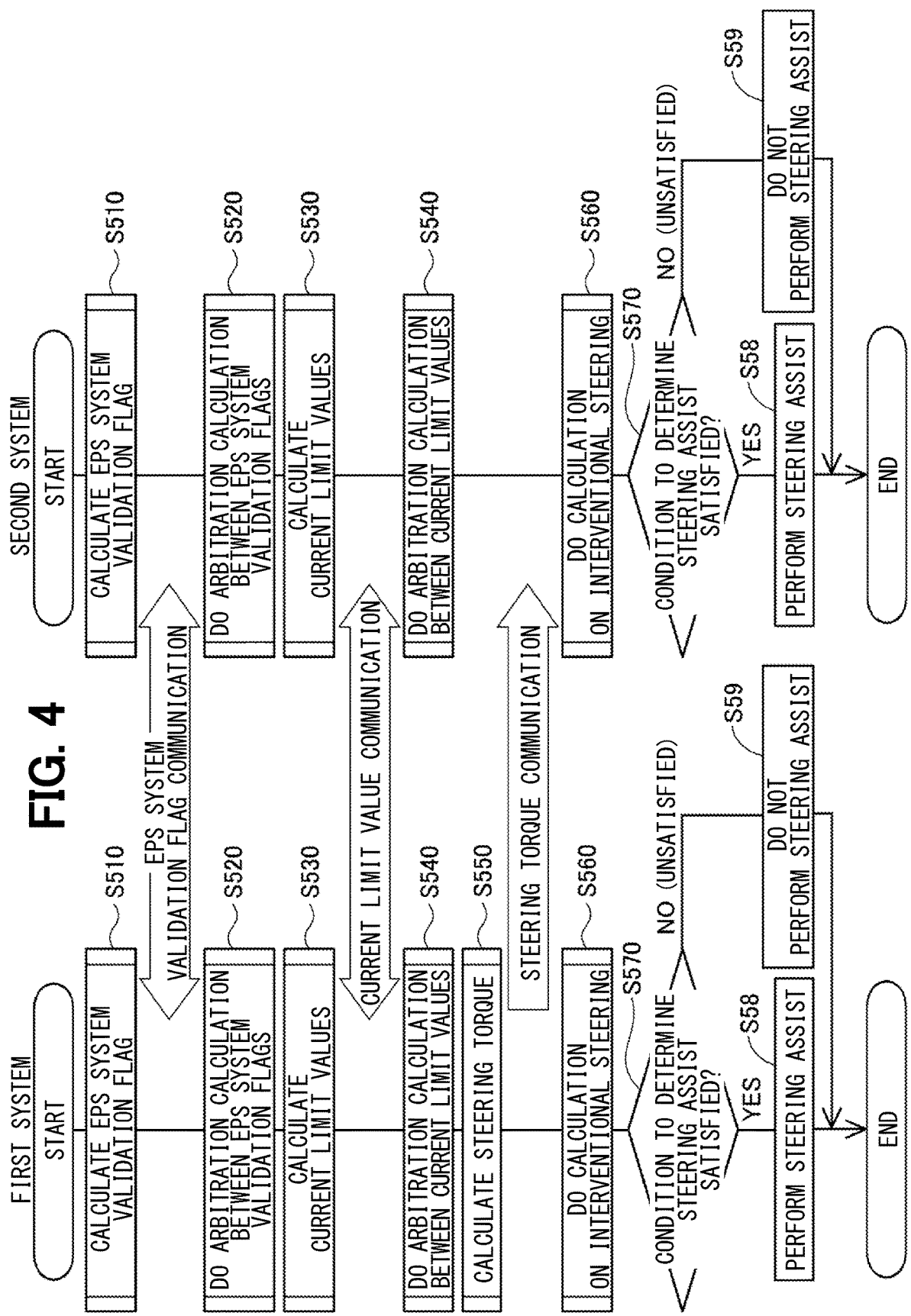
FIG. 4 is a main flowchart according to the embodiment to determine the start of vehicle control in EPS.

In FIG. 4, an EPS system validation flag and a current limit value are provided as internal values for the controllers 31 and 32. In S510, the microcomputers 41 and 42 in the respective systems calculate the EPS system validation flag and mutually communicate operation results via the inter-microcomputer communication. In S520, the microcomputers 41 and 42 operate to arbitrate between the EPS system validation flag in the own system and the EPS system validation flag received from the other system.

Figure 5:
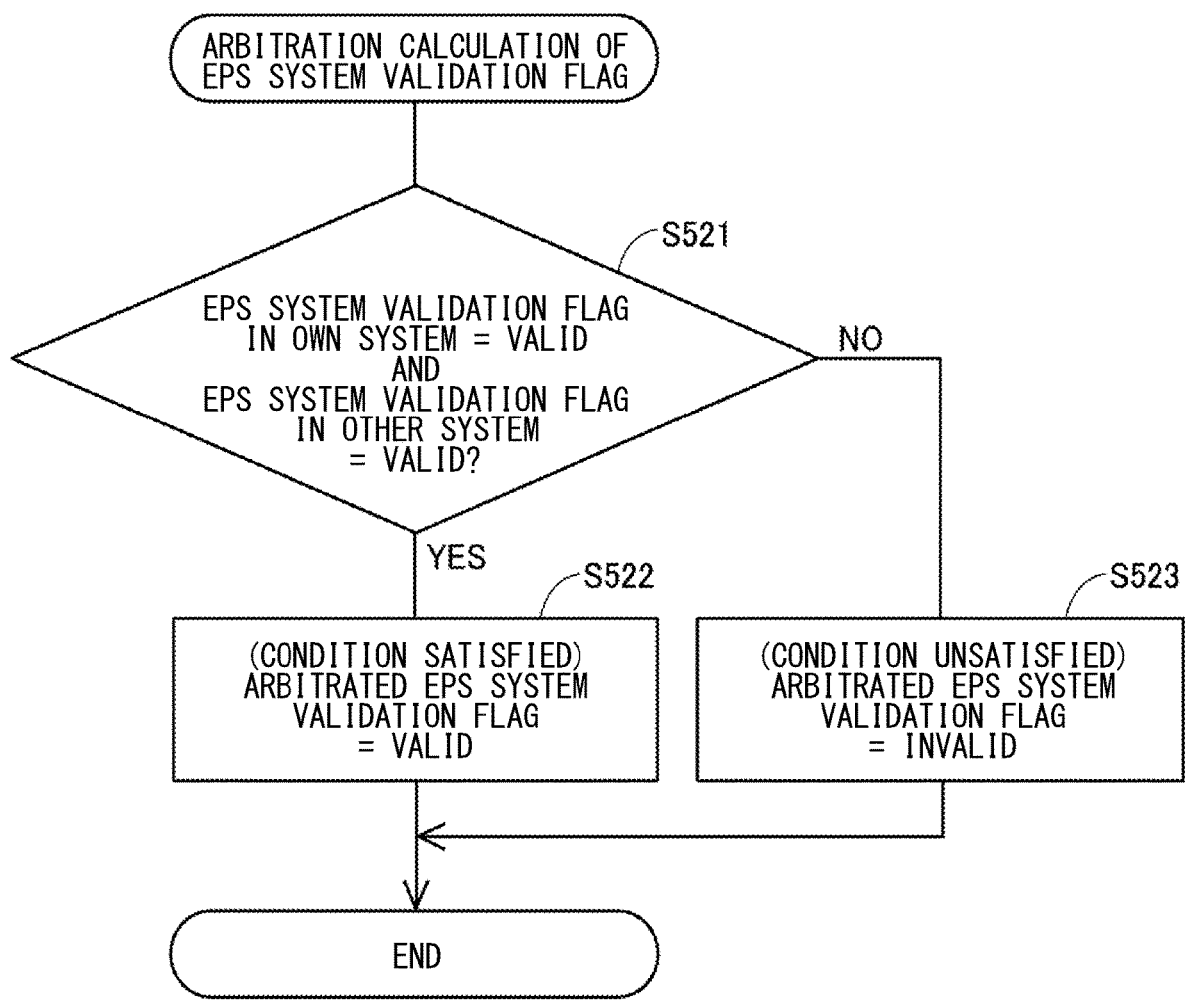
FIG. 5 is a sub-flowchart illustrating a calculation process to arbitrate an EPS validation flag.

Specifically, in S521 in FIG. 5, the process determines whether the EPS system validation flag in the own system is valid and the EPS system validation flag in the other system is valid. If S521 results in YES, the condition is satisfied. In S522, the process validates an EPS system validation flag after arbitration. If S521 results in NO, either system malfunctions. The steering assist needs to be inhibited. The condition is not satisfied. In S523, the process invalidates the EPS system validation flag after arbitration.

In S530, the microcomputers 41 and 42 in the respective systems calculate current limit values and mutually communicate operation results via the inter-microcomputer communication. In S540, the microcomputers 41 and 42 operate to arbitrate between the current limit value in the own system and the current limit value received from the other system. It is favorable to select a smaller one of the arbitrated current limit values from the viewpoint of system protection.

In S550, the first microcomputer 41 as the master calculates a steering torque and transmits the steering torque to the second microcomputer 42. Namely, both systems use the steering torque value calculated by the system that calculates the current instruction value. In S560, based on the steering torque, the process performs a calculation operation on interventional steering, namely, a calculation operation on the override due to a driver's intervention during the steering assist. In S570, based on the above-described operation result, the process determines whether a condition to determine the steering assist is satisfied.

Figure 6:
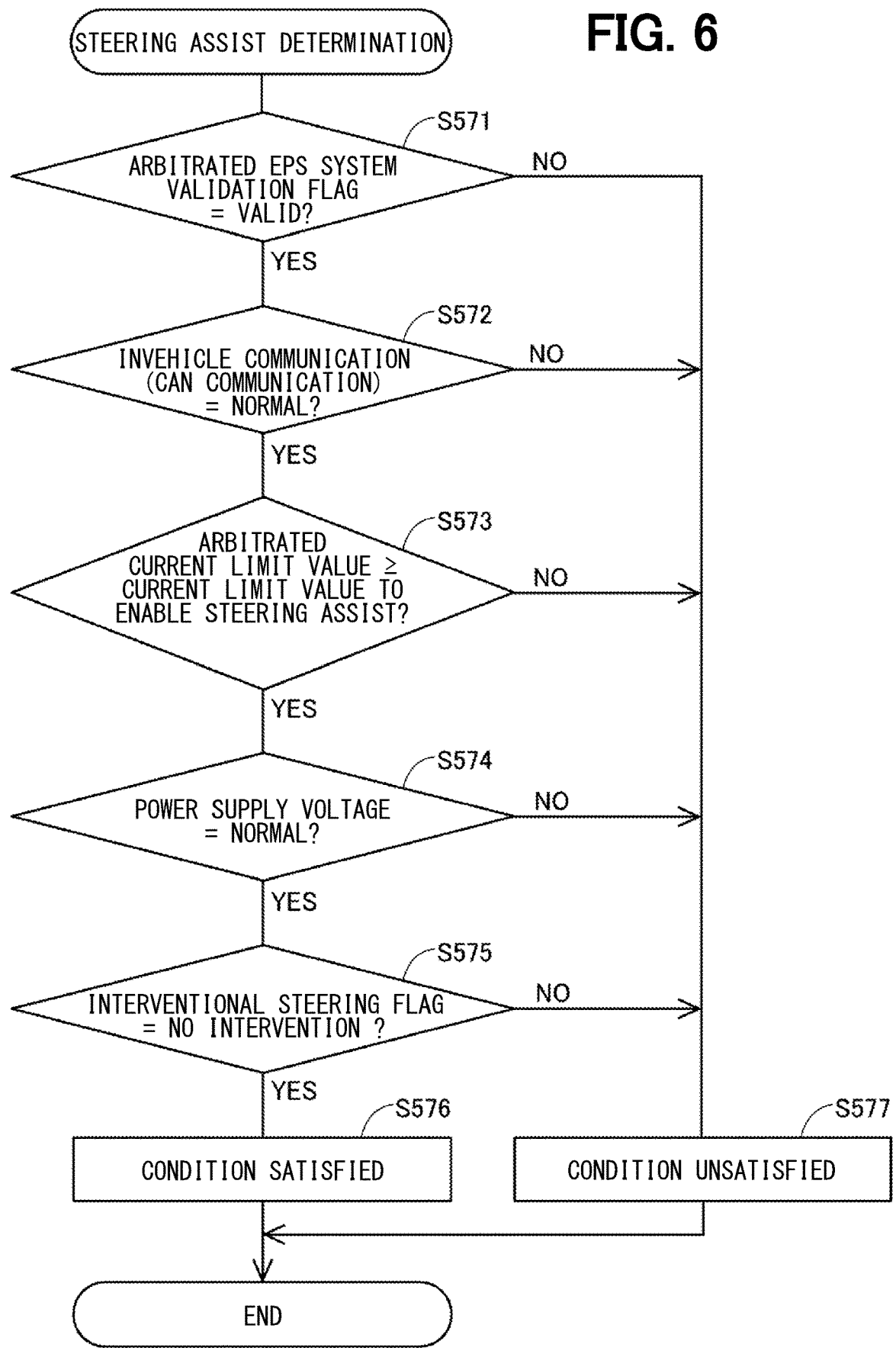
FIG. 6 is a sub-flowchart illustrating a process to determine the steering assist in FIG. 4.

Specifically, the process determines five items corresponding to S571 through S575 in FIG. 6. In S571, the process determines whether the EPS system validation flag after arbitration is valid. In S572, the process determines whether the in-vehicle communication such as CAN communication is normal. In S573, the process determines whether the arbitrated current limit value is larger than or equal to a current limit value to enable the steering assist. In S574, the process determines whether a power supply voltage for communication does not drop and is normal. In S575, the process determines whether an interventional steering flag negates an intervention. If all S571 through S575 result in YES, the process determines in S576 that the condition is satisfied. If at least one of the five items results in NO, the process determines in S577 that the condition is not satisfied.

Referring back to FIG. 4, S570 results in YES if the condition is satisfied. In S58, the process performs the steering assist. S570 results in NO if the condition is not satisfied. In S59, the process determines not to perform the steering assist. The process finally determines whether to perform the steering assist.

FIG. 7 illustrates a flowchart for the assist map changeover. For example, the flowchart format in FIG. 4 applies to FIG. 7. In S610, the process performs a sports mode control operation. In S620, the process performs an assist map operation. The first microcomputer 41 as the master transmits a control map state to the second microcomputer 42. Namely, both systems use the control map state in the system that calculates the current instruction value. In S630, the process performs a control map state operation.

In S64, the process determines whether a driver operates the steering wheel. If the driver does not operate the steering wheel, S64 results in NO. In S65, the process changes an assist map. If the driver operates the steering wheel, S64 results in YES. The process does not change the assist map.

As above, the motor control device 30 includes two controllers 31 and 32. When the vehicle control is turned on or off, the motor control device 30 arbitrates between the vehicle control signal and internal signals for the controllers 31 and 32 and finally determines whether to perform the vehicle control. However, one controller may control the vehicle but the other controller may not control the vehicle due to improper timing in communication or calculation. It may be difficult to provide intended vehicle control corresponding to vehicle signals. Depending on cases, an abnormality may be determined and the EPS system may stop the assist.

The present disclosure aims at synchronizing timings to start and end the vehicle control in the motor control device 30 including the two controllers 31 and 32. As a solution, the motor control device 30 uses inter-microcomputer communication to exchange necessary signals and perform an arbitration process.

Figure 8:
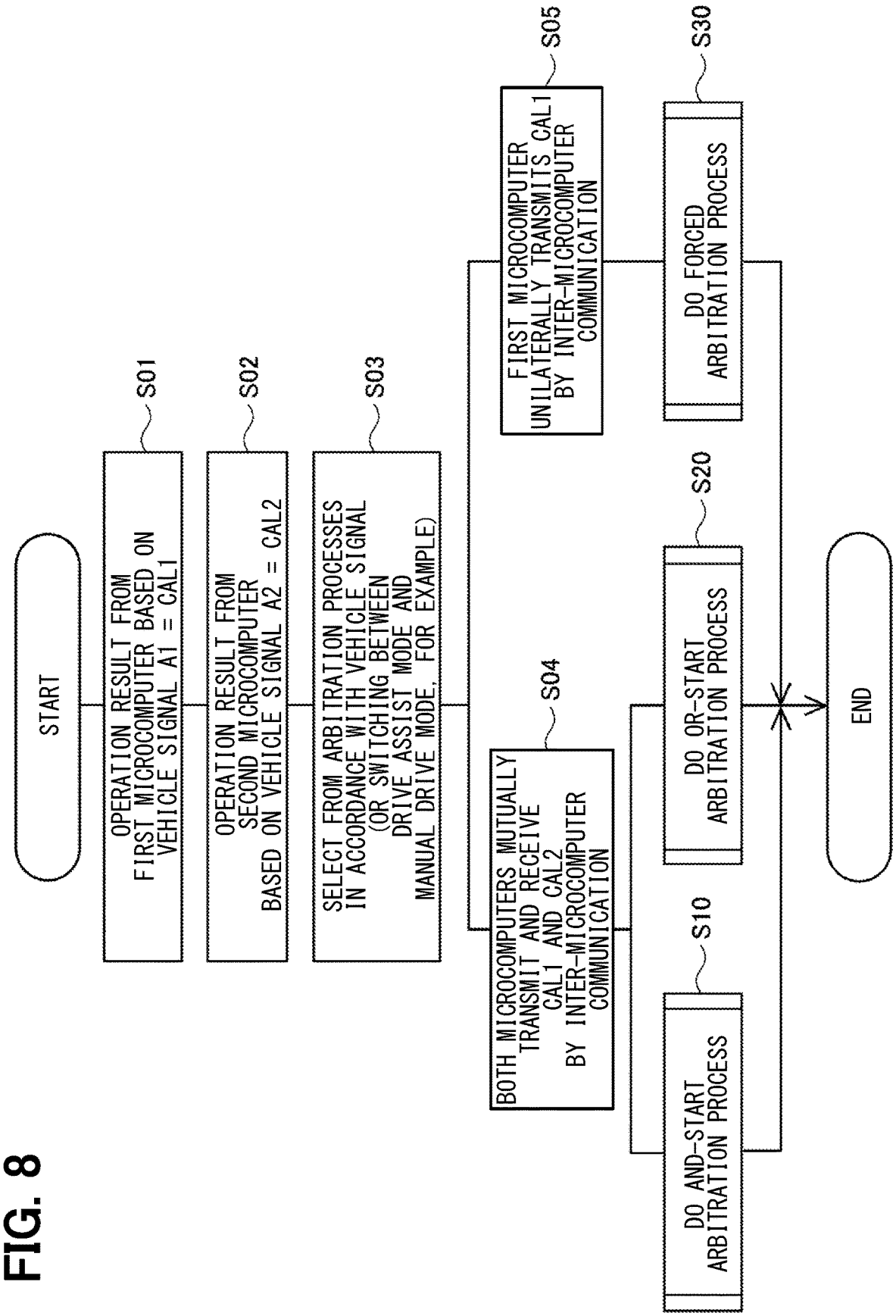
FIG. 8 is a main flowchart illustrating an arbitration process according to the present embodiment.

The description below explains an arbitration process according to the present embodiment with reference to the main flowchart in FIG. 8 and a sub-flowchart in FIGS. 9A to 9C. Both the first microcomputer 41 and the second microcomputer 42 perform the arbitration process.

In S01, the first microcomputer 41 performs a calculation operation based on acquired vehicle signal A1 and provides an operation result as "CAL1." In S02, the second microcomputer 42 performs a calculation operation based on acquired vehicle signal A2 and provides an operation result as "CAL2." In S03, the process selects one of three arbitration processes such as an AND-start arbitration process in S10, an OR-start arbitration process in S20, and a forced arbitration process in S30.

The "AND-start arbitration process" starts the control when a start condition is satisfied in operation results from both microcomputers. The "AND-start arbitration process" ends the control when an end condition is satisfied in an operation result from at least one of the microcomputers. The "OR-start arbitration process" starts the control when a start condition is satisfied in an operation result from at least one of the microcomputers. The "OR-start arbitration process" ends the control when an end condition is satisfied in operation results from both microcomputers. The "forced arbitration process" starts the control when a start condition is satisfied in an operation result from the first microcomputer 41. The "forced arbitration process" ends the control when an end condition is satisfied in an operation result from the first microcomputer 41.

The first microcomputer 41 and the second microcomputer 42 select one of the three types of arbitration processes depending on the acquired vehicle signal and execute the selected arbitration process. It is favorable to select the "AND-start arbitration process" when starting the safety-conscious vehicle control such as automatic operation. Meanwhile, it is favorable to select the "OR-start arbitration process" for a quick response when starting the override that reflects the driver's positive intention. The operation result of the first microcomputer 41 may be also referred to as a first operation result. The operation result of the second microcomputer 42 may be also referred to as a second operation result.

It is favorable to select the "forced arbitration process" when always prioritizing operation result CAL1 from the first microcomputer 41 as the master. The first microcomputer 41 and the second microcomputer 42 may select from the three types of arbitration processes according to switching between a drive assist mode and a manual operation mode by the driver, for example.

When the "AND-start arbitration process" or the "OR-start arbitration process" is selected, in S04 before the arbitration process, both microcomputers 41 and 42 mutually transmit and receive operation results CAL1 and CAL2 based on the inter-microcomputer communication. When the "forced arbitration process" is selected, before the arbitration process, the first microcomputer 41 unilaterally transmits operation result CAL1 from the first microcomputer 41 based on the inter-microcomputer communication.

Figure 9C:
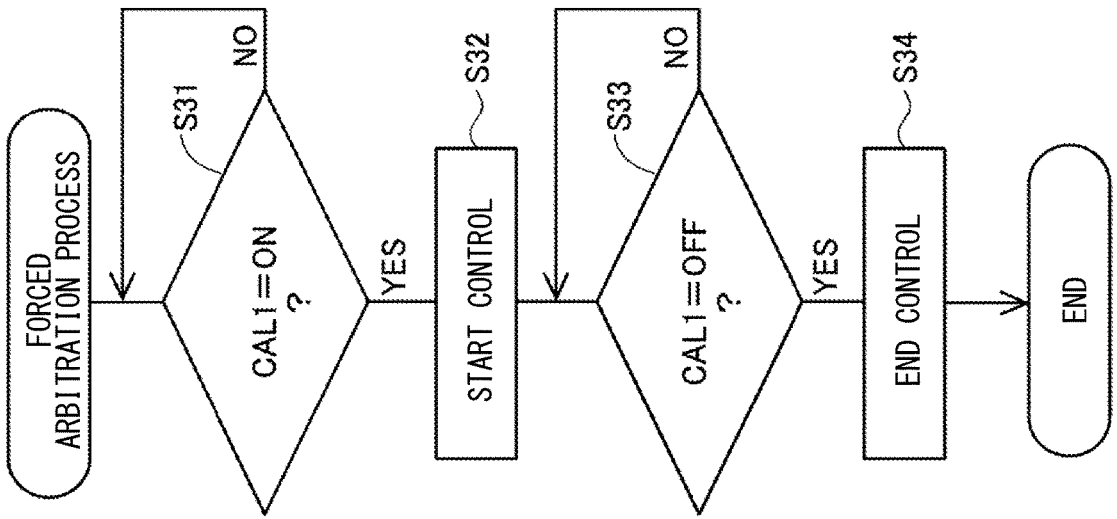
FIG. 9C is a sub-flowchart illustrating the forced arbitration process in FIG. 8.
Figure 9B:
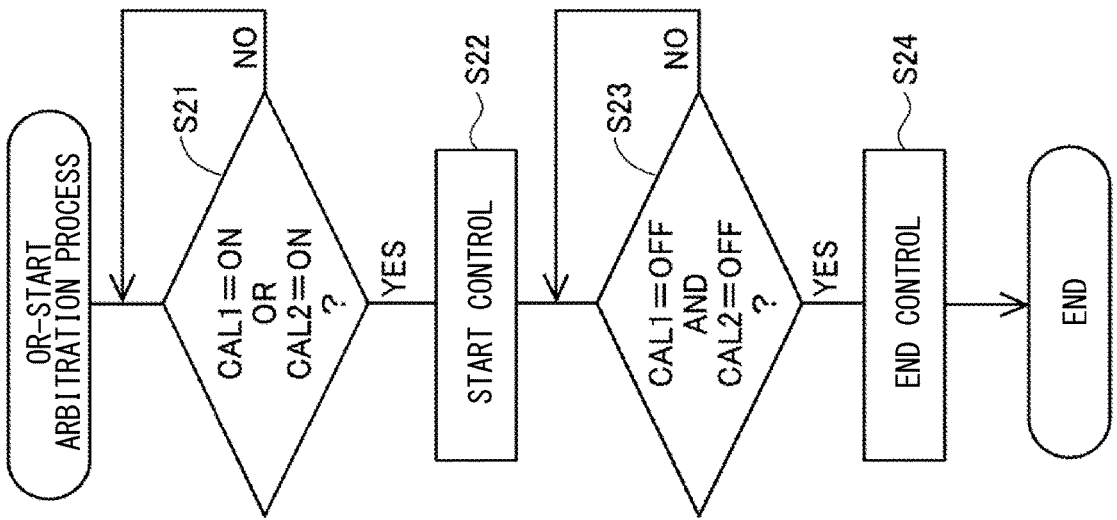
FIG. 9B is a sub-flowchart illustrating the OR-start arbitration process in FIG. 8.
Figure 9A:
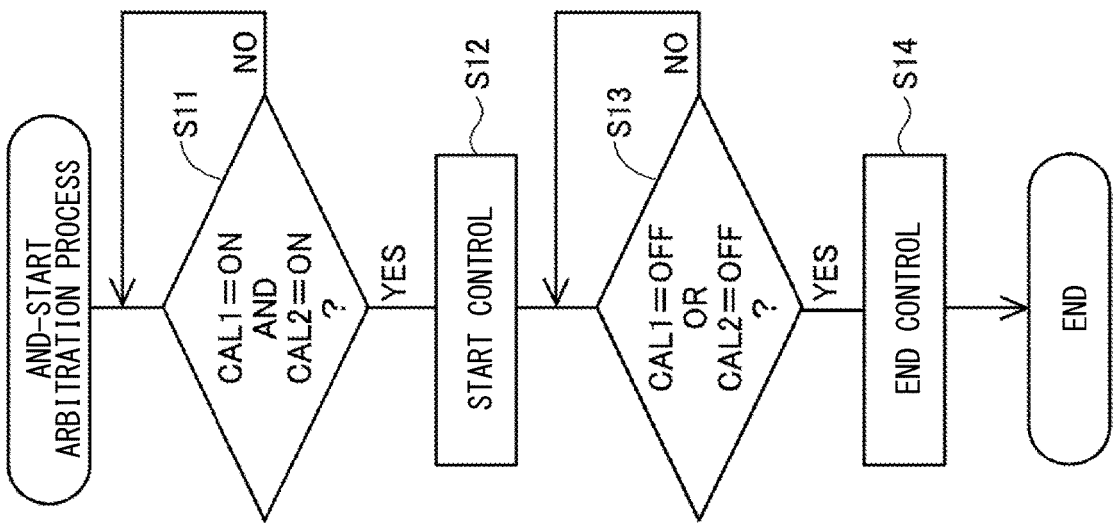
FIG. 9A is a sub-flowchart illustrating the AND-start arbitration process in FIG. 8.

As FIG. 9A illustrates, the "AND-start arbitration process" includes S11 through S14. In S11, the process determines whether the operation result CAL1 of the first microcomputer 41 is ON (in other words, is in an on-state) and the operation result CAL2 of the second microcomputer 42 is ON. If the result is YES, the process starts the control in S12. If the result is NO, the process does not start the control. In S13, the process determines whether the operation result CAL1 of the first microcomputer 41 is OFF (in other words, is in an off-state) and the operation result CAL2 of the second microcomputer 42 is OFF. If the result is YES, the process terminates the control in S14. If the result is NO, the process does not terminate the control.

As FIG. 9B illustrates, the "OR-start arbitration process" includes S21 through S24. In S21, the process determines whether the operation result CAL1 of the first microcomputer is ON and the operation result CAL2 of the second microcomputer 42 is ON. If the result is YES, the process starts the control in S22. If the result is NO, the process does not start the control. In S23, the process determines whether the operation result CAL1 of the first microcomputer 41 is OFF and the operation result CAL2 of the second microcomputer 42 is OFF. If the result is YES, the process ends the control in S24. If the result is NO, the process does not end the control.

The "AND-start arbitration process" determines whether to end the control based on an operation result from at least one of the microcomputers. When both the operation results CAL1 and CAL2 of the microcomputers 41 and 42 are OFF, the control may be ended according to a determination similar to the determination of the "OR-start arbitration process" to terminate the control.

As FIG. 9C illustrates, the "OR-start arbitration process" includes S31 through S34. In S31, the process determines whether the operation result CAL1 of the first microcomputer 41 is ON. If the result is YES, the process starts the control in S32. If the result is NO, the process does not start the control. In S33, the process determines whether the operation result CAL1 of the first microcomputer 41 is OFF. If the result is YES, the process ends the control in S34. If the result is NO, the process does not end the control.

The motor control device 30 can synchronize timings to start and end the control in the "AND-start arbitration process," the "OR-start arbitration process," or the "forced arbitration process," whichever is executed. The motor control device 30 according to the present embodiment can provide the intended vehicle control corresponding to vehicle signals.

Figure 10:
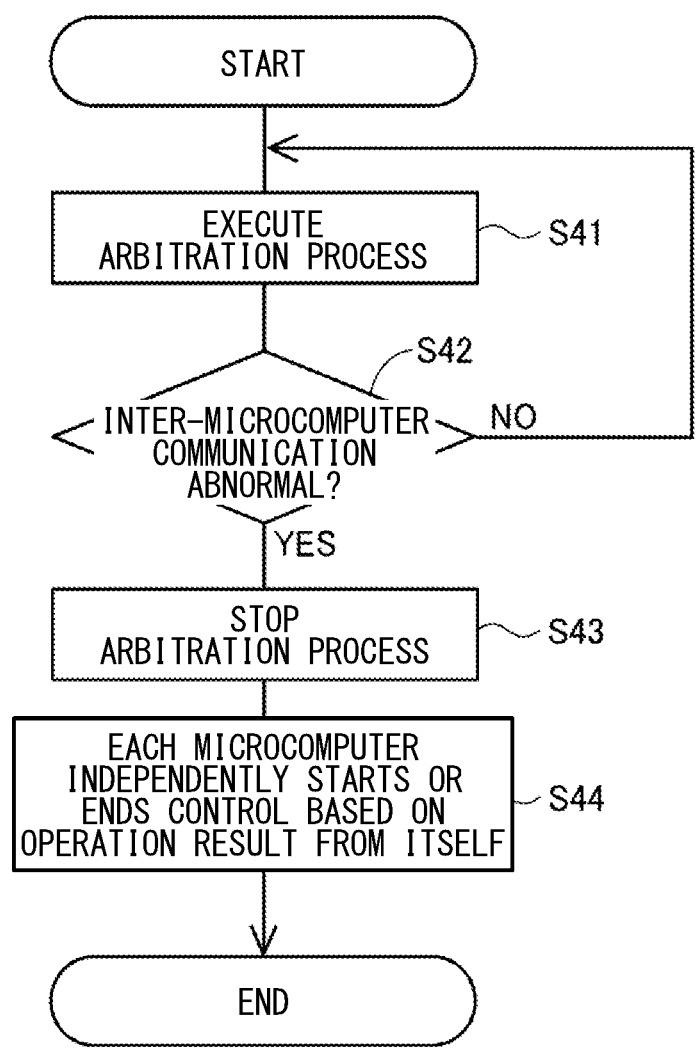
FIG. 10 is a flowchart illustrating a process to stop the arbitration process due to abnormality in inter-microcomputer communication.
Figure 11:
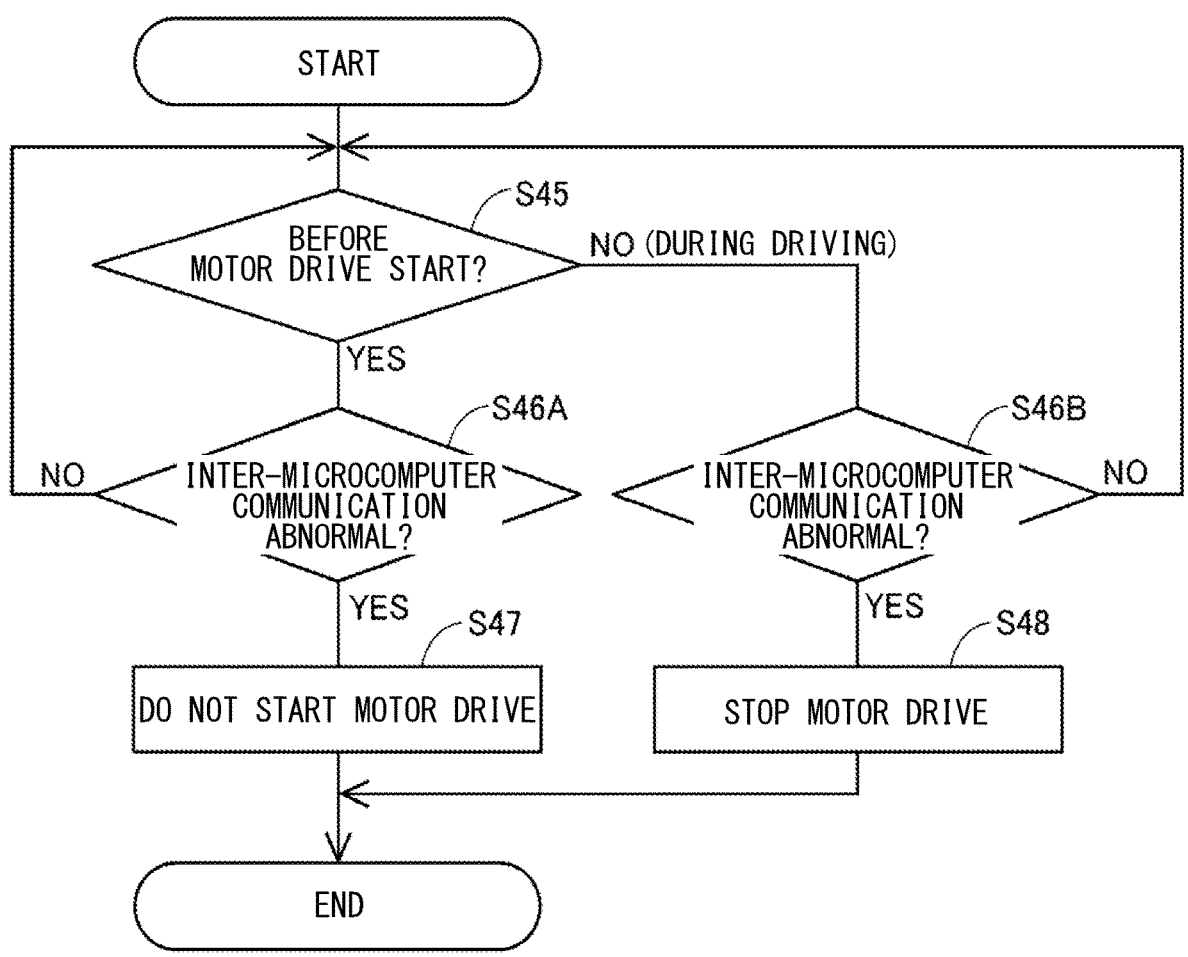
FIG. 11 is a flowchart illustrating a process not to start or to stop driving a motor due to abnormality in inter-microcomputer communication.

With reference to FIGS. 10 and 11, the description below explains a process when the inter-microcomputer communication has an abnormality. The microcomputers 41 and 42 may not receive an essential signal from the correlative microcomputer or may receive a signal different from the signal transmitted from the correlative microcomputer. In such a case, the microcomputers detect an occurrence of inter-microcomputer communication error and perform an error handling process as illustrated in FIG. 10 or 11. FIG. 10 illustrates a process to stop the arbitration process. FIG. 11 illustrates a process not to start or to stop driving the motor.

In S41 in FIG. 10, the arbitration process is performed as an initial state. In S42, the process determines whether the inter-microcomputer communication is abnormal. If it is determined that the inter-microcomputer communication is abnormal and the result of S42 is YES, the microcomputers 41 and 42 stop the arbitration process in S43. In S44, each microcomputer independently starts or ends the control based on the operation result from itself. If it is determined that the inter-microcomputer communication is normal and the result of S42 is NO, the process returns to S41.

It may be possible to perform the vehicle control even when the inter-microcomputer communication has the abnormality. The microcomputers 41 and 42 may repeatedly execute the routine in FIG. 10 and may re-execute the arbitration process when the inter-microcomputer communication is restored to the normal state.

In S45 in FIG. 11, the process determines whether the motor is currently ready to drive. If the motor is ready to drive, it is determined that the result of S45 is YES. The process proceeds to S46A. If the motor is driven, it is determined that the result of S45 is NO. The process proceeds to S46B. In S46A and S46B, the process determines whether the inter-microcomputer communication is abnormal. If it is determined that the inter-microcomputer communication is abnormal and the result of S46A is YES, the microcomputers 41 and 42 do not start driving the motor in S47. If it is determined that the result of the S46B is YES, the microcomputers 41 and 42 stop driving the motor in S48. If it is determined that the inter-microcomputer communication is normal and the result of S46A or S46B is NO, the process returns to S45.

It is possible to prevent the vehicle control from being performed when the inter-microcomputer communication has the abnormality and the reliability is not ensured sufficiently. The system reliability improves.

Other Embodiments (a) The motor control device according to the present disclosure may perform any one of the AND-start arbitration process, the OR-start arbitration process, and the forced arbitration process and need not always switch from the three types of arbitration processes. In FIG. 8, for example, the AND-start arbitration process may be always performed when the safety always takes precedence regardless of the vehicle signal types. Alternatively, the OR-start arbitration process may be always performed when the prompt response always takes precedence regardless of the vehicle signal types.

(b) A driver may be able to freely select from the three types of arbitration processes regardless of the above-described examples in the embodiment. The arbitration process may stop based on other abnormalities than the inter-microcomputer communication abnormality or other factors than abnormalities.

(c) The motor control device according to the present disclosure arbitrates operation results from the two microcomputers in the two controllers. There may be provided another microcomputer for monitoring or backup in addition to the two microcomputers to be arbitrated.

(d) The motor control device according to the present disclosure may control driving of not only the steering assist motor for EPS but also motors as "motors contributing to vehicle operations" mainly for brakes, fans, and fluid pumps. The motor is not limited to a three-phase brushless motor but may be provided as a brushed DC motor.

It is to be distinctly understood that the present disclosure is not limited to the above-mentioned embodiments but may be otherwise variously embodied within the spirit and scope of the disclosure.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the process of the flowchart in the present disclosure includes multiple steps (also referred to as sections), each of which is represented, for example, as S1. Further, each step can be divided into several sub-steps while several steps can be combined into a single step.

The invention claimed is:

1. A motor control device that drives a motor contributing to vehicle operations based on a vehicle signal including drive assist information and performs vehicle control, the motor control device comprising:
   a first controller and a second controller that perform a calculation operation concerning drive control over the motor based on the vehicle signal acquired from an in-vehicle communication line,
   wherein
   a first microcomputer
      corresponds to a calculation portion of the first controller and functions as a master,
   a second microcomputer
      corresponds to a calculation portion of the second controller and functions as a slave,
   the first microcomputer and the second microcomputer mutually transmit and receive operation results from the first microcomputer and the second microcomputer by inter-microcomputer communication, or the first microcomputer unilaterally transmits an operation result from the first microcomputer by the inter-microcomputer communication,
   the first microcomputer and the second microcomputer synchronize timings to start and end the vehicle control by performing one of three types of arbitration processes including:
      an AND-start arbitration process that
         starts the vehicle control when a start condition is satisfied in the operation results from both of the first microcomputer and the second microcomputer, and
         ends the vehicle control when an end condition is satisfied in the operation result from at least one of the first microcomputer or the second microcomputer;
      an OR-start arbitration process that
         starts the vehicle control when a start condition is satisfied in the operation result from at least one of the first microcomputer or the second microcomputer, and
         ends the vehicle control when an end condition is satisfied in the operation results from both of the first microcomputer and the second microcomputer; and
      a forced arbitration process that
         starts the vehicle control when a start condition is satisfied in the operation result from the first microcomputer, and ends the vehicle control when an end condition is satisfied in the operation result from the first microcomputer, wherein when an abnormality of the inter-microcomputer communication occurs before the motor is driven, the first microcomputer and the second microcomputer do not start driving the motor, and when the abnormality of the inter-microcomputer communication occurs while the motor is driven, the first microcomputer and the second microcomputer stop driving the motor.

2. The motor control device according to claim 1, wherein the first microcomputer and the second microcomputer select one of the three types of arbitration processes and perform the one of the three types of arbitration processes based on the acquired vehicle signal.

3. The motor control device according to claim 2, wherein the first microcomputer and the second microcomputer select the one of the three types of arbitration processes in accordance with switching between a drive assist mode and a manual operation mode by a driver.

4. The motor control device according to claim 1, wherein when an abnormality of the inter-microcomputer communication occurs, the first microcomputer and the second microcomputer stop the arbitration process and independently start or end the vehicle control based on the operation result from each of the first microcomputer and the second microcomputer.

5. The motor control device according to claim 1, wherein the motor corresponds to a steering assist motor for an electric power steering system.

6. The motor control device according to claim 1, wherein the operation result from the first microcomputer corresponds to a first operation result and the operation result of the second microcomputer corresponds to a second operation result, in the AND-start arbitration process, the start condition is satisfied when the first operation result and the second operation result are in an on-state, in the AND-start arbitration process, the end condition is satisfied when the first operation result or the second operation result is in an off-state, in the OR-start arbitration process, the start condition is satisfied when the first operation result or the second operation result is in the on-state, in the OR-start arbitration process, the end condition is satisfied when the first operation result and the second operation result are in the off-state, in the forced arbitration process, the start condition is satisfied when the first operation result is in the on-state, and in the forced arbitration process, the end condition is satisfied when the first operation result is in the off-state.

7. A motor control device that drives a motor contributing to vehicle operations based on a vehicle signal including drive assist information and performs vehicle control, the motor control device comprising:

a first controller and a second controller that perform a calculation operation concerning drive control over the motor based on the vehicle signal acquired from an in-vehicle communication line, wherein a first microcomputer corresponds to a calculation portion of the first controller and functions as a master, a second microcomputer corresponds to a calculation portion of the second controller and functions as a slave, the first microcomputer and the second microcomputer mutually transmit and receive operation results from the first microcomputer and the second microcomputer by inter-microcomputer communication, or the first microcomputer unilaterally transmits an operation result from the first microcomputer by the inter-microcomputer communication, the first microcomputer and the second microcomputer synchronize timings to start and end the vehicle control by performing one of three types of arbitration processes including:

an AND-start arbitration process that starts the vehicle control when a start condition is satisfied in the operation results from both of the first microcomputer and the second microcomputer, and ends the vehicle control when an end condition is satisfied in the operation result from at least one of the first microcomputer or the second microcomputer;

an OR-start arbitration process that starts the vehicle control when a start condition is satisfied in the operation result from at least one of the first microcomputer or the second microcomputer, and ends the vehicle control when an end condition is satisfied in the operation results from both of the first microcomputer and the second microcomputer; and a forced arbitration process that starts the vehicle control when a start condition is satisfied in the operation result from the first microcomputer, and ends the vehicle control when an end condition is satisfied in the operation result from the first microcomputer, wherein the operation result from the first microcomputer corresponds to a first operation result and the operation result of the second microcomputer corresponds to a second operation result, and wherein in the AND-start arbitration process, the start condition is satisfied when the first operation result and the second operation result are in an on-state, in the AND-start arbitration process, the end condition is satisfied when the first operation result or the second operation result is in an off-state, in the OR-start arbitration process, the start condition is satisfied when the first operation result or the second operation result is in the on-state, in the OR-start arbitration process, the end condition is satisfied when the first operation result and the second operation result are in the off-state, in the forced arbitration process, the start condition is satisfied when the first operation result is in the on-state, and in the forced arbitration process, the end condition is satisfied when the first operation result is in the off-state.

8. The motor control device according to claim 7, wherein the first microcomputer and the second microcomputer select one of the three types of arbitration processes and perform the one of the three types of arbitration processes based on the acquired vehicle signal.

9. The motor control device according to claim 8, wherein the first microcomputer and the second microcomputer select the one of the three types of arbitration processes in accordance with switching between a drive assist mode and a manual operation mode by a driver.

10. The motor control device according to claim 7, wherein
when an abnormality of the inter-microcomputer communication occurs, the first microcomputer and the second microcomputer stop the arbitration process and independently start or end the vehicle control based on the operation result from each of the first microcomputer and the second microcomputer.

11. The motor control device according to claim 7, wherein
when an abnormality of the inter-microcomputer communication occurs before the motor is driven, the first microcomputer and the second microcomputer do not start driving the motor, and
when the abnormality of the inter-microcomputer communication occurs while the motor is driven, the first microcomputer and the second microcomputer stop driving the motor.

12. The motor control device according to claim 7, wherein
the motor corresponds to a steering assist motor for an electric power steering system.

* * * * *